United States Patent [19]
Nishiwaki et al.

[11] Patent Number: 5,111,018
[45] Date of Patent: May 5, 1992

[54] CONNECTION MEMBER IN A WELDING GUN FOR ROBOT

[75] Inventors: Toshihiro Nishiwaki; Shigeru Umeda; Tsuyoshi Takatori, all of Tokyo, Japan

[73] Assignee: Obara Corporation, Tokyo, Japan

[21] Appl. No.: 674,553

[22] Filed: Mar. 22, 1991

[30] Foreign Application Priority Data

May 9, 1990 [JP] Japan .................. 2-47709[U]

[51] Int. Cl.⁵ .............................. B23K 11/10
[52] U.S. Cl. .................. 219/86.25; 219/116; 901/42
[58] Field of Search .............. 219/86.25, 86.31, 89, 219/90, 116; 901/42

[56] References Cited

U.S. PATENT DOCUMENTS 4,525,618 6/1985 Beneteau ..................... 219/116
4,559,438 12/1985 Nakadate et al. ............. 219/116

FOREIGN PATENT DOCUMENTS 1458519 12/1976 United Kingdom .......... 901/42

*Primary Examiner*—Geoffrey S. Evans
*Attorney, Agent, or Firm*—Flynn, Thiel, Boutell & Tanis

[57] ABSTRACT

A connection member in a welding gun for a robot having a cradle of the welding gun generates less stress by directly connecting the cradle with a robot wrist, whereby the welding gun is positioned as close as possible to the robot wrist. The welding gun for robot can be shortened by accommodating a welding transformer inside a hollow frame defined in the cradle.

8 Claims, 2 Drawing Sheets

CONNECTION MEMBER IN A WELDING GUN FOR ROBOT

BACKGROUND OF THE INVENTION

1. Field of the Invention

The present invention relates to a connection member in a welding gun for robot for connecting a cradle of the welding gun to a robot wrist.

2. Prior Art

There was a prior art connection member for connecting a welding gun to a robot wrist as illustrated in FIG. 3.

That is, a cradle 25 has a pivotal mounting portion 24 at one end thereof for pivotally mounting welding gun arms 22 and 23 thereon and a welding transformer 26 at the other end thereof. The welding gun arms 22 and 23 can be opened and closed by a pneumatic cylinder 21. The welding transformer 26 is connected to a robot wrist 28 by way of a connection bracket 27. The connection bracket 27 has flanges 29 and 30 at both sides thereof to which bolts are attached. The bracket 27 is connected to the welding transformer 26 by bolts 31 fastened to the flange 29 while it is connected to the robot wrist 28 by bolts 32 fastened to the flange 30.

However, there was such a problem in the prior art connection member that when the welding gun is connected to the robot wrist by way of the flanges 29 and 30 provided at both sides of the connection bracket 27, the bolts 31 are screwed into the flange 29 and the bolts 32 are screwed into the flange 30, hence there is needed a gap corresponding to at least the length of the bolts 31 and 32 so that the welding gun is disposed at a position remote from the robot wrist.

There was still such a problem in the prior art connection member that since the welding transformer 26 is connected to the rear portion of the cradle 25 the welding gun is lengthened as a whole for the length of the welding transformer 26.

SUMMARY OF THE INVENTION

The present invention has been made in view of the problems in the prior art connection member in a welding gun for robot.

It is an object of the present invention to provide a connection member in a welding gun for robot having a cradle directly connected to a robot wrist and capable of reducing the generation of stress by disposing the welding gun close to the robot wrist.

It is another object of the present invention to provide a connection member in a welding gun for robot capable of reducing the entire length of the welding gun by accommodating the welding transformer into the cradle.

The above and other objects, features and advantages of the present invention will become more apparent from the following description taken in conjunction with the accompanying drawings.

DESCRIPTION OF THE PREFERRED EMBODIMENT

Figure 1:
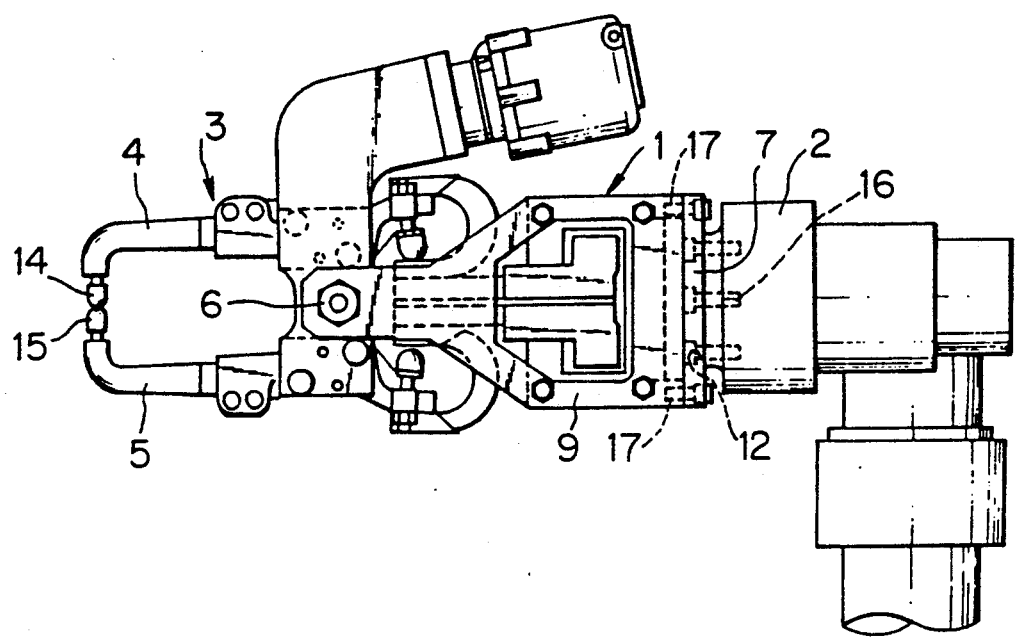
FIG. 1 is a side view showing a connection member in a welding gun for robot according to a preferred embodiment of the present invention.
Figure 2:
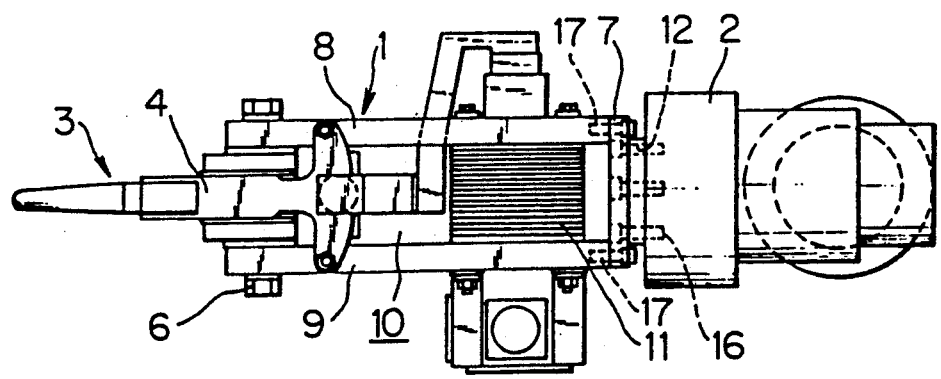
FIG. 2 is a plan view of the connection member of FIG. 1.
Figure 3:
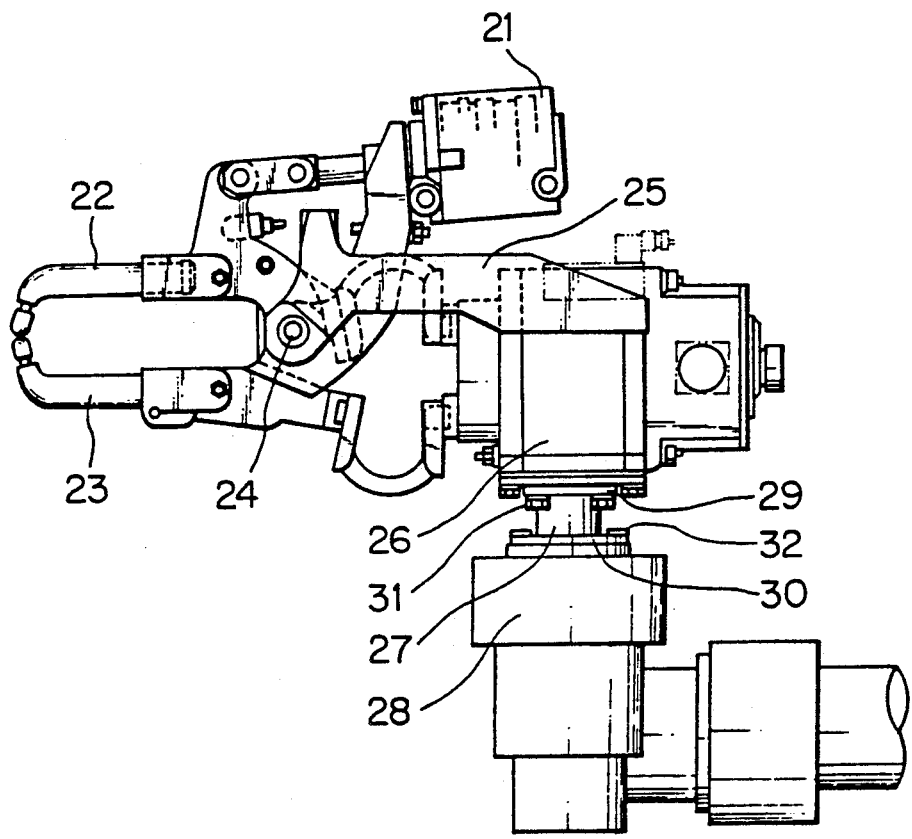
FIG. 3 is a side view showing a prior art connection member in a welding gun for robot.

A connection member in a welding gun for robot will be described with reference to FIGS. 1 and 2.

In the same figures, designated at 1 is a cradle provided with a pivotal mounting portion 6 at the front portion thereof and an attaching portion 7 at the rear portion thereof which cradle 1 is disposed between a robot wrist 2 attached to the attaching portion 7 via bolts 12 (described later) and a welding gun 3 provided with welding gun arms 4 and 5 pivotally mounted on the pivotal mounting portion 6. The attaching portion 7 has first bolt insertion holes at the portion adjacent to the periphery thereof and third bolt insertion holes 12 inside the first bolt insertion holes. Side plates 8 and 9 have second bolt insertion holes flushing with and corresponding to the first bolt insertion holes. Bolts 17 are threaded into the first bolt insertion holes of the attaching portion 7 from the outside thereof and further threaded into the second bolt insertion holes of the side plates 8 and 9. The cradle 1 constitutes a hollow frame 10 by the attaching portion 7 and side plates 8 and 9 fixed to the attaching portion 7 by screwing bolts 17 mentioned just above or welding.

The attaching portion 7 directly contacts the robot wrist 2 and has third bolt insertion holes 12 confronted with the robot wrist 2. The robot wrist 2 has fourth bolt insertion holes flushing with and corresponding to the third bolt insertion holes 12 defined in the attaching portion 7. To connect the cradle 1 to the robot wrist 2, bolts 16 are threaded into the third bolt insertion holes 12 of the attaching portion 7 from the inside of the hollow frame 10 of the cradle 1 and further threaded into the fourth bolt insertion holes of the robot wrist 2. A welding transformer 11 is held inside the hollow frame 10 of the cradle 1. The welding gun arms 4 and 5 have electrodes 14 and 15 at the distal ends thereof which electrodes 14 and 15 are openable and closable by the operation of a pressure application cylinder 13.

According to the connection member in a welding gun for robot of the present invention, inasmuch as the attaching portion of the cradle is directly attached to robot wrist, the center of gravity of the welding gun can be positioned as close as possible to the robot wrist. As a result, it is possible to obtain the connection member in a welding gun for robot generating less stress and the robot can support more weight. Still furthermore, the connecting operation can be made with ease since both the robot wrist and the cradle can be connected mainly by threading the bolts from the inside of the cradle. Finally, the welding gun can be shortened if the welding transformer is held inside the hollow frame of the cradle.

Although the invention has been described in its preferred form with a certain degree of particularity, it is to be understood that many variations and changes are possible in the invention without departing from the scope thereof.

What is claimed is:

1. A welding gun assembly, comprising:
 a hollow frame means including a pair of generally opposed elongate side plates which extend between opposite ends of said hollow frame means in generally parallel spaced relationship, a pivotal mounting portion connected to said side plates adjacent one end of said hollow frame means, and an attaching portion connected to said side plates adjacent the other end of said hollow frame means, said hollow frame means defining therein an interior space which is generally bounded by said side plates, said pivotal mounting portion and said attaching portion;

a pair of welding gun arms pivotally mounted on said pivotal mounting portion for pivotal movement about a pivot axis, said welding gun arms projecting outwardly from said hollow frame means;

a robot having a wrist portion which is operable to articulate a tool;

attachment means for removably fastening said wrist portion of said robot in flush abutment against said attaching portion of said hollow frame means with said wrist portion disposed exteriorly of said hollow frame means; and said attachment means including a plurality of through holes provided in said attaching portion, a plurality of holes provided in said robot wrist portion and generally coaxially aligned with the respective through holes of said attaching portion, a plurality of elongate fastening elements extending from inside said hollow frame means outwardly through the respective through holes and projecting outwardly from said hollow frame means into the associated coaxially aligned holes of said robot wrist portion, said elongate fastening elements being removably positioned in said aligned holes of said attaching portion and said robot wrist portion, each said elongate fastening element having an end portion which projects inwardly into the interior space of said hollow frame means to permit access to and removal of said elongate fastening element, and each said elongate fastening element being otherwise inaccessible.

2. The welding gun assembly according to claim 1, wherein said elongate fastening elements extend generally parallel to said elongate side plates.

3. The welding gun assembly according to claim 1, wherein said elongate fastening elements are bolts, said end portions being defined by the heads of said bolts.

4. The welding gun assembly according to claim 3, wherein said attaching portion has further through holes provided therein, said side plates being provided with holes which are coaxially aligned with said further through holes, and including further bolts extending through said further through holes and projecting into said holes in said side plates to fasten said side plates to said attaching portion.

5. The welding gun assembly according to claim 4, including a welding transformer disposed in the interior space of said hollow frame means.

6. The welding gun assembly according to claim 4, wherein all of said bolts extend generally parallel to said elongate side plates, said pivot axis extending transversely relative to said elongate side plates.

7. The welding gun assembly according to claim 6, wherein said attaching portion has a plate-like structure including a central part in which said first-mentioned through holes are provided and an outer peripheral part in which said further through holes are provided.

8. The welding gun assembly according to claim 7, including a welding transformer disposed in the interior space of said hollow frame means.

* * * * *